W. C. STEVENS.
VARIABLE SPEED TRANSMISSION GEARING.
APPLICATION FILED MAY 10, 1919.
1,344,319.
Patented June 22, 1920.
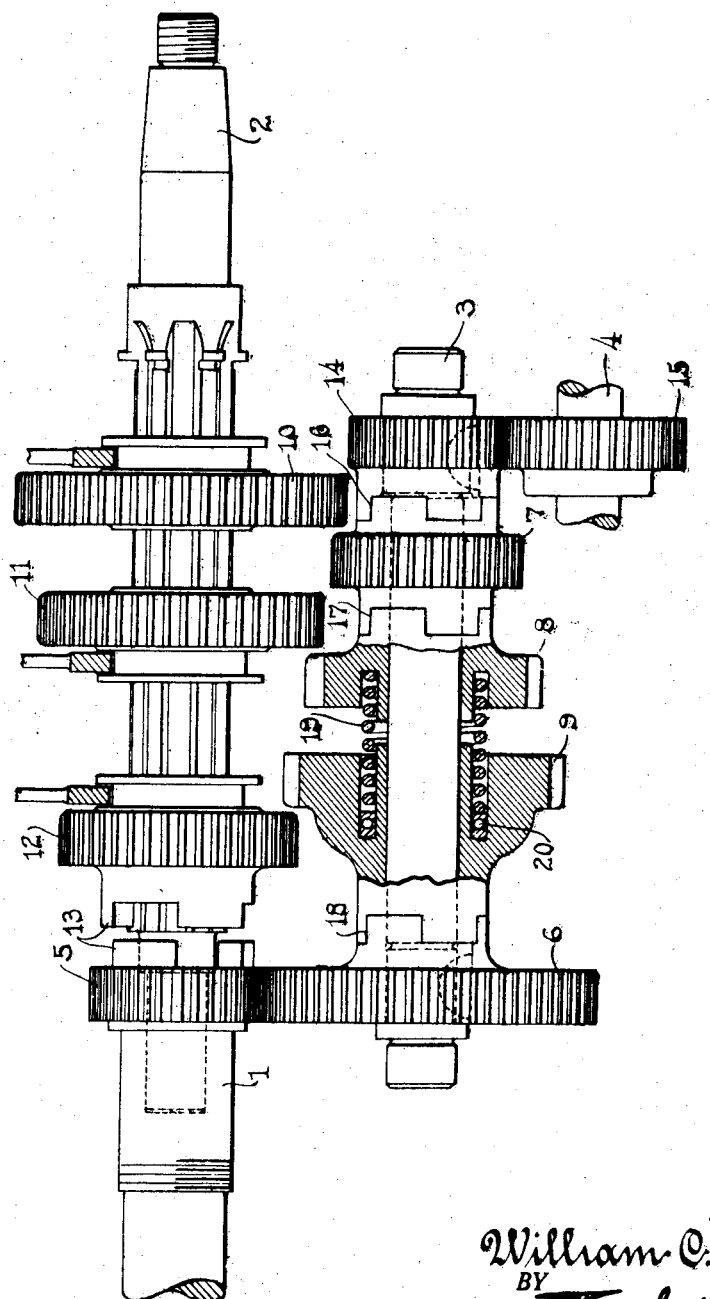
INVENTOR.
William C. Stevens
BY
ATTORNEY

UNITED STATES PATENT OFFICE.

WILLIAM C. STEVENS, OF MILWAUKEE, WISCONSIN, ASSIGNOR TO THE CUTLER-HAMMER MFG. CO., OF MILWAUKEE, WISCONSIN, A CORPORATION OF WISCONSIN.

VARIABLE-SPEED-TRANSMISSION GEARING.

1,344,319.  Specification of Letters Patent.  Patented June 22, 1920.

Application filed May 10, 1919. Serial No. 296,208.

*To all whom it may concern:*

Be it known that I, WILLIAM C. STEVENS, a citizen of the United States, residing at Milwaukee, in the county of Milwaukee and State of Wisconsin, have invented new and useful Improvements in Variable-Speed-Transmission Gearing, of which the following is a full, clear, concise, and exact description, reference being had to the accompanying drawing, forming a part of this specification.

This invention relates to variable speed transmission gearing for automobiles and other machines and more particularly to that type wherein speed changes are effected through the medium of sliding gears.

It has heretofore been proposed to obviate certain difficulties encountered in effecting shifts of gearing of this type, by substitution therefor of constantly meshing gears and jaw clutches for releasable coupling of certain of said gears to their respective shafts, said jaw clutches being operable through the medium of compression springs to facilitate engagement of their parts. However, the proposed constantly meshing gears are also open to objections which render the latter type of gearing of little, if any, improvement over the former type.

The present invention has among its objects to overcome the aforesaid difficulties of the former type of gearing without necessitating constant meshing of the gears thereof.

A further object is to provide gearing of the former type wherein springs are employed to facilitate shifting operations and in a manner to minimize rebounding of the parts subjected to the influence thereof.

Other objects and advantages of the invention will hereinafter appear.

The accompanying drawing illustrates more or less schematically with all shafts in the same plane, one embodiment of the invention which will now be described, it being understood that the invention may be embodied in other forms falling within the scope of the appended claims.

The gearing illustrated is particularly adapted for automobiles and is of a type providing four speeds in a forward direction and one speed in a reverse direction. More specifically, there is shown a driving shaft 1, a driven shaft 2, a counter shaft 3 and a reversing shaft 4. The driving shaft 1 has keyed thereon a pinion 5 constantly meshing with a spur gear 6 keyed on the counter shaft 3 and the latter shaft has mounted thereon gears 7, 8, and 9 to be respectively and selectively meshed with gears 10, 11 and 12 slidingly keyed on the driven shaft 2. The three sets of gears 7—10, 8—11 and 9—12 provide for three different speed ratios of the shafts 2 and 3 and the sliding gear 12 and pinion 4 have coöperating jaws constituting a coupling 13 by means of which the driven shaft may be directly connected to the driving shaft to provide a fourth speed. Also, the shaft 3 has keyed thereon a pinion 14 constantly meshing with a gear 15 mounted on the reversing shaft 4 and adapted to be meshed by the gear 10 on the driven shaft for reverse rotation of the latter.

The gears 7, 8 and 9 are loosely mounted on the counter shaft to both rotate and slide thereon but are provided with jaw clutches 16, 17 and 18 whereby they are normally secured to said shaft to rotate therewith. The clutch 16 has one set of jaws on the gear 7 and a coöperating set of jaws on the pinion 14 keyed to the counter shaft while the clutch 17 has one set of jaws on the gear 7 and a coöperating set of jaws on the gear 8 whereby when both clutches are engaged both gears 7 and 8 rotate with said shaft. The clutch 18, on the other hand, has one set of jaws on the gear 9 and a coöperating set of jaws on the gear 6 whereby when this clutch is engaged the gear 9 is also rotated with the shaft 3. Further, a helical spring 19 surrounding the shaft 3 is interposed between the gears 8 and 9 whereby said gears are biased to a relation for normal engagement of all of said clutches.

Thus while the gears 7, 8 and 9 are normally locked to the counter shaft to rotate therewith each is slidable on the shaft against the force of spring 19 for separation of the jaws of its respective clutch. Thereupon the released gear is free for rotation on the shaft 3 and the sliding gears 10, 11 and 12 are so arranged as to approach their respective gears 7, 8 and 9 in the same direction as that in which the latter are movable for disengagement of their respective clutches. Accordingly, shifting of any one of the gears on the driven shaft into engagement with its respective gear on the counter shaft either results in immediate meshing of said gears or unclutching of the latter gear from the counter shaft. In the latter event, the spring forces the gears into mesh as soon as the teeth thereof are in proper relation and without any clashing or grinding since the gear on the counter shaft is loose. Then when the gears are meshed the spring acts to reset the released clutch which may be accomplished very much more readily and quietly than the meshing of gears in the ordinary type of transmission gearing. Moreover, the arrangement is such that the external force exerted during shifting tends to check and eliminate rebound when the sliding gear contacts with the spring pressed gear.

In this instance, no provision is made for facilitating the meshing of gears for revrse operation but as will be apparent, similar provision may be made therefor if desired. Also, it will be apparent that the gears 7, 8 and 9 may be provided with separate springs, if preferred.

What I claim as new and desire to secure by Letters Patent is:

1. In variable speed transmission gearing, the combination with a gear mounted for axial movement and provided with a releasable driving connection, said connection being releasable by axial movement of said gear and said gear being biased against such movement, of an independently mounted gear shiftable axially into and out of mesh with said first mentioned gear.

2. In variable speed transmission gearing, in combination, a shaft, a gear loosely mounted thereon, a clutch for connecting said gear to said shaft subject to release upon axial movement of said gear in one direction a spring opposing such movement of said gear and an independently mounted gear shiftable axially into and out of mesh with the former gear.

3. In variable speed transmission gearing in combination a plurality of gears mounted for axial movement and provided with releasable driving connections and subject to release by axial movements of said gears a single spring coacting with said gears to oppose axial movement of each in releasing direction and a plurality of gears each mounted for axial movement into and out of mesh with one of said first mentioned gears.

4. In variable speed transmission gearing in combination at least three gears mounted for axial movement and provided with releasable driving connections releasable by axial movements of said gears, the releasing movements of a plurality of said gears being in the same direction and opposed to that of another of said gears, a single spring coacting with said gears to oppose the releasing movement of each and a plurality of gears each mounted for axial movement into and out of mesh with one of said first mentioned gears.

In witness whereof I have hereunto subscribed my name.

WILLIAM C. STEVENS.